United States Patent [19]

Annecke et al.

[11] Patent Number: 4,641,306
[45] Date of Patent: Feb. 3, 1987

[54] CIRCUIT ARRANGEMENT FOR TESTING A DIGITAL CIRCUIT

[75] Inventors: Karl-Heinz Annecke, Backnang; Volker Bredemeier-Klonki, Oppenweiler, both of Fed. Rep. of Germany

[73] Assignee: ANT Nachrichtentechnik GmbH, Backnang, Fed. Rep. of Germany

[21] Appl. No.: 630,066

[22] Filed: Jul. 12, 1984

[30] Foreign Application Priority Data

Jul. 13, 1983 [DE] Fed. Rep. of Germany ....... 3325247

[51] Int. Cl.⁴ .............................................. G06F 3/04
[52] U.S. Cl. ......................................... 371/25; 371/20
[58] Field of Search ........................... 371/20, 24, 25; 364/200, 900

[56] References Cited

U.S. PATENT DOCUMENTS

| | | | |
|---|---|---|---|
| 3,976,864 | 8/1976 | Gordon et al. | 235/153 |
| 4,441,182 | 4/1984 | Best | 371/25 |
| 4,476,431 | 10/1984 | Blum | 371/25 |
| 4,503,536 | 3/1985 | Panzer | 371/25 |
| 4,519,078 | 5/1985 | Komonytsky | 371/25 |
| 4,534,030 | 8/1985 | Paez et al. | 371/25 |

OTHER PUBLICATIONS

R. C. Dixon, "Spread Spectrum Systems", Wiley & Sons, New York, 1976, pp. 54-55 and pp. 80-85.
John J. O'Reilly, The Radio and Electronic Engineer, vol. 45, No. 4, pp. 171-176, Apr. 1975.
Scrambler/Descrambler IC SH100 B485, Siemens OEM Products for Telecommunications, 1.82, (4 pages).
F 100 K ECL Data Book of Fairchild 1982 (F100131 Triple D Flip-Flop (pp. 3-47-3-52).
F 100K ECL Data Book of Fairchild 1982 (F100102 Quint 2-Input OR/NOR Gate).

*Primary Examiner*—Michael R. Fleming
*Attorney, Agent, or Firm*—Spencer & Frank

[57] ABSTRACT

Circuit arrangement for dynamic real time testing of a synchronous digital circuit having a clock pulse input, a stimulus input and a circuit node at which a digital test signal is produced after a time delay of $\tau$ seconds relative to the time of receipt of a signal at the stimulus input. The arrangement includes a clock pulse generator for generating clock pulses; a transmitter device connected to the clock pulse generator and including a counter for counting the clock pulses and a digital signal generator for generating a reproducible digital stimulus signal having a length corresponding to a predetermined count of the counter. The transmitter device is connected for coupling a number of clock pulses corresponding to the predetermined count of the counter to the clock pulse input of the digital circuit and for delivering the digital stimulus signal to the stimulus input of the digital circuit in synchronism with the clock pulses coupled to the clock pulse input. An analyzing device has a first input arranged for receiving the digital test signal from the digital circuit and a second input connected for receiving the same number of clock pulses coupled to the digital circuit. The analyzing device is arranged for compressing and analyzing the test signal for errors. A device is provided for imparting a time delay of $\tau$ seconds to the clock pulses received by the analyzing means.

9 Claims, 4 Drawing Figures

CIRCUIT ARRANGEMENT FOR TESTING A DIGITAL CIRCUIT

BACKGROUND OF THE INVENTION

The present invention relates to a circuit arrangement for the dynamic real time testing of a synchronous digital circuit.

Before operationally used in a system, a completely developed and realized synchronous digital circuit must be subjected not only to a static test, but also to a dynamic real time test, with the latter being used to determine the limit frequency so as to classify the circuit.

German Offenlegungsschrift [laid-open Patent Application] No. 2,538,651 discloses a method for testing a digital electronic circuit using signature analysis techniques and a circuit arrangement for implementing the method, wherein the digital electronic circuit is clocked by a clock pulse generator and emits a digital signal at a measuring point. The emitted digital signal is processed by means of an identification generator device at defined, equal-length time periods to form a test signature pattern which is compared with a desired bit pattern.

However, the foregoing circuit arrangement operates only at a clock pulse frequency up to approximately 50 MHz. With clock pulse frequencies higher than that, such a circuit arrangement produces erroneous indications.

SUMMARY OF THE INVENTION

It is therefore an object of the present invention to provide a circuit arrangement in which a dynamic real time test for a digital electronic circuit is possible at frequencies greater than 100 MHz.

The above and other objects are accomplished by the invention wherein a circuit arrangement is provided for dynamic real time testing of a synchronous digital circuit having a clock pulse input, a stimulus input and a circuit node at which a digital test signal is produced after a time delay of $\tau$ seconds relative to the time of receipt of a signal at the stimulus input. The arrangement includes clock pulse generator means for generating clock pulses; transmitter means connected to the clock pulse generator means and including a counter for counting the clock pulses and a digital signal generator means for generating a reproducible digital stimulus signal having a length corresponding to a predetermined count of the counter, the transmitter means being connected for coupling a number of clock pulses corresponding to the predetermined count of the counter to the clock pulse input of the digital circuit and for delivering the digital stimulus signal to the stimulus input of the digital circuit in synchronism with the clock pulses coupled to the clock pulse input; analyzing means having a first input arranged for receiving the digital test signal from the digital circuit and a second input connected for receiving the same number of clock pulses coupled to the digital circuit, the analyzing means being arranged for compressing the test signal into a test signature and analyzing the test signature for errors by comparison with a desired signature; and means for imparting a time delay of $\tau$ seconds to the clock pulses received by the analyzing means.

DESCRIPTION OF THE PREFERRED EMBODIMENTS

Figure 1:
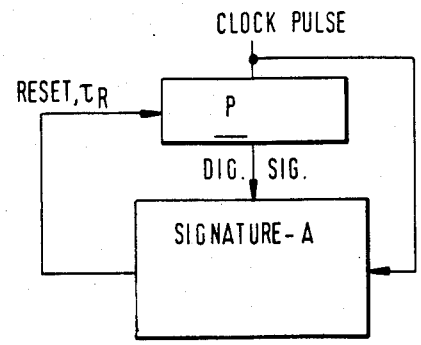
FIG. 1 is a block circuit diagram of a circuit arrangement for testing a digital circuit according to the prior art.

FIG. 1 shows a digital circuit P to be tested which is connected with a signature analysis device, Signature-A, according to the above German Offenlegungsschrift No. 2,538,651. Circuit P and the signature analysis device, Signature-A, each directly receive a clock pulse. Circuit P emits a digital signal, Dig. Sig. after a delay time $\tau$ after receipt of the clock pulse. The Dig. Sig. is fed to the signature analysis device, Signature-A, which generates a test signature therefrom. Signature-A includes a start/stop device which is used to reset circuit P via a reset line "Reset", this resetting being assumed to take place with a delay time of $\tau_R$ after receipt of the clock pulse. It can easily be seen that with greater clock pulse frequencies, at which the delay time $\tau_R$ approaches the duration of the clock pulse period, bit errors in the test signature could be generated. The same also applies for the delay time $\tau$ of the circuit P. An example for a digital circuit P to be tested is a scrambler/descrambler IC SH 100 B 485 described in SIEMENS OEM products for telecommunications 1.82.

Figure 2:
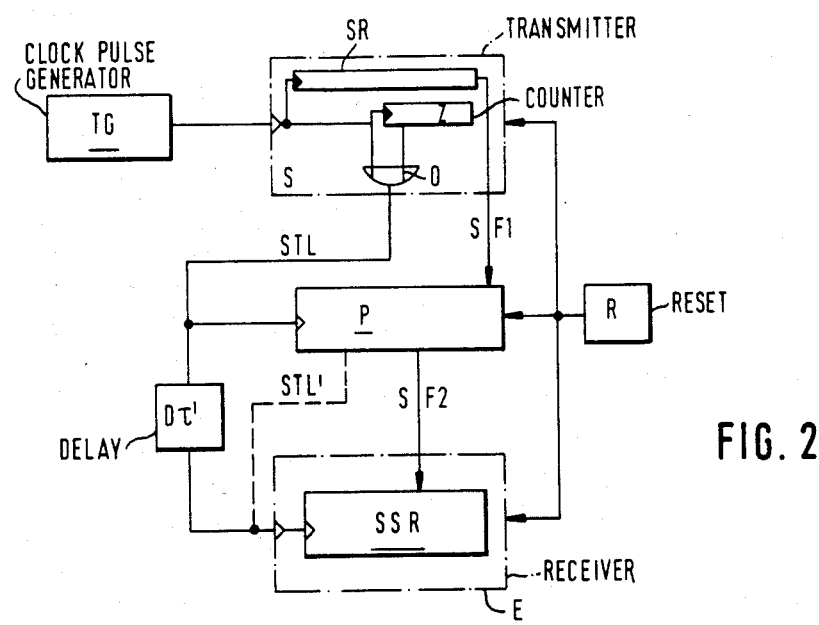
FIG. 2 is a block circuit diagram of a circuit arrangement for testing a digital circuit according to the present invention.

The foregoing problem is overcome by the circuit arrangement according to the invention as illustrated in FIG. 2, which includes a clock pulse generator TG, a transmitter S, a digital circuit P to be tested, and a receiver E. Transmitter S includes a feedback-connected shift register SR having n stages which generates a serial data stream SF1 of a length $2^n-1$ which serves as a stimulus signal for circuit P. Transmitter S further includes a counter Z which counts out a defined number of clock pulses. The clock pulse is supplied to circuit P by an OR-gate O. When the counter has reached its highest counting state it produces a continuous output signal which is fed to the OR-gate O, effectively blocking the clock pulse STL at the output of OR-gate O. By means of a reset device R, transmitter S, test circuit P and receiver E can simultaneously receive a system reset pulse, which again enables the sytem clock pulse.

The data stream SF1, which is a defined and reproducible bit pattern produced during a measuring period corresponding to the highest counter state of counter Z excites the circuit nodes of the signal paths actuated in circuit P. Circuit P is simultaneously clocked by the system clock pulse STL passed via OR gate O which is enabled during the measuring period M defined by counter Z. The same number of clock pulses are fed via a delay member D to receiver E. Delay member D has a delay time $\tau'$ which corresponds to the delay time $\tau$ of circuit P. Circuit P generates an output signal having a data sequence SF2 which is made available to the receiver E in the correct time sequence, in that the data sequence SF2 is summed in time by means of a feedback connected shift register SSR and is thus compressed. A digital word or test signature corresponding to the length of the shift register SSR, can now be obtained at the outputs of the signature shift resiter SSR. A comparison is then made of the test signature with the desired signature, with missing bits or an offset in time of certain bits in the test signature being evident in a deviation between the test signature and the desired signature.

Delay member D may be omitted if the system clock pulse sequence is routed through and delayed by the circuit P and is fed to the receiver as the system clock pulse STL' (shown by means of the dashed line in FIG. 2). Further time compensation measures to the clock pulse STL' are then not necessary if the clock pulse as routed through circuit P is in the correct time association with the data sequence SF2 at the output of circuit P.

An example for a digital circuit P with a clock pulse output is given above. An easy example for a digital circuit P without a clock pulse output may be one D-Flip Flop F 100 131 described in F 100 K ECL Data Book of Fairchild 1982. In the last case the necessary delay member D with corresponding delay time of the FF may be the Enable path of an OR-Gate F 100 102 also described in F 100 K ECL Data Book of Fairchild 1982. Data stream generation with feedback connected shift registers is described in "Spread Spectrum Systems" by R. C. Dixon, Wiley & Sons, New York, 1976, especially see pages 54–55 and pages 80–85 of Chapter 3.

Figure 3:
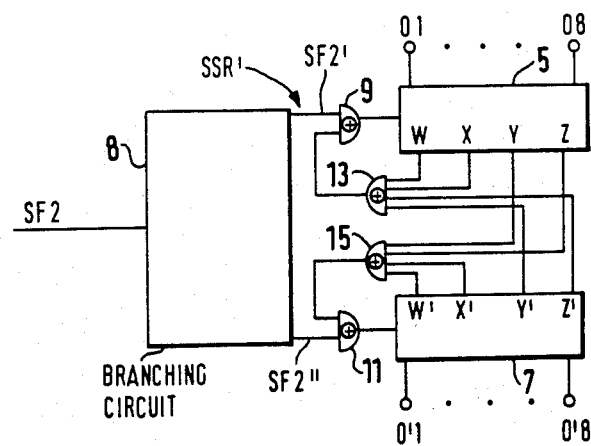
FIG. 3 is a block curcuit diagram showing an alternative embodiment of a component in FIG. 2.

FIG. 3 shows a signature shift register SSR' which employs two parallel operated serial shift registers 5 and 7 which may be used in lieu of shift register SSR in FIG. 2. The data SF2 to be compressed are initially divided in the correct time sequence by branching circuit 8 into two parallel data streams SF2' and SF2" which are then fed via respective EXOR gates 9 and 11 to two feedback connected shift registers 5 and 7, respectively, with one shift register receiving the even numbered bits and the other shift register the odd numbered bits. EXOR gate 9 also receives a feedback input from an EXOR gate 13 which is connected for receiving inputs from the W and X stages of shift register 5 and from the Y' and Z' stages of shift register 7. In a similar manner, EXOR gate 11 is connected for receiving a feedback input from an EXOR gate 15 which in turn receives its inputs from the W' and X' stages of shift register 7 and the Y and Z stages of shift register 5. With such feedback connections, which are only by way of example, the two shift registers 5 and 7 will have the same signature at their outputs 01 ... 08 and 0'1 ... 0'8, respectively, as a single shift register of twice the length. The advantage of having two parallel branches is that only half the system frequency is required. For instance the first 8-bit-shift register 5 has the feedback connections W=7, X=9, Y'=12 and Z'=16, and the second 8-bit-shift register 7 has the feedback connections W'=6, X'=8, Y=11 and Z=15, respectively, which corresponds to a serial 16-bit-shift register with the feedback connections Q7, Q9, Q12 and a serial 16-bit-shift Q16.

Figure 4:
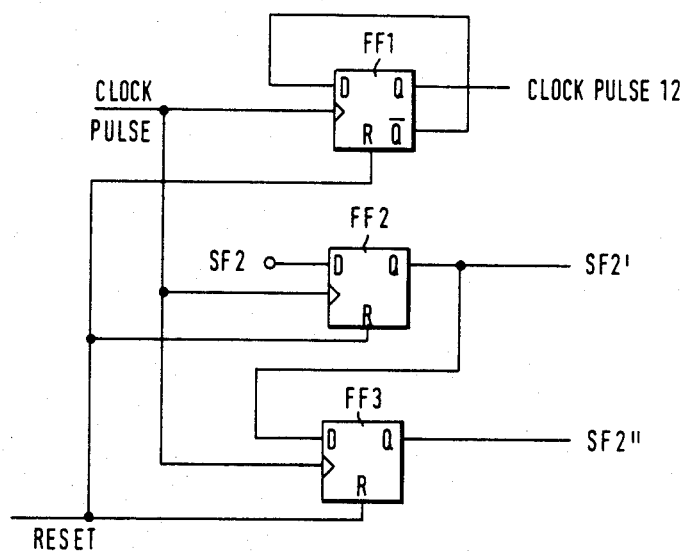
FIG. 4 is a circuit diagram of an embodiment of FIG. 3.

FIG. 4 shows an example of the branching circuit 8 in FIG. 3, consisting of three D-flip flops FF1, FF2 and FF3. The D-flip flop FF1 is feedback coupled from its $\bar{Q}$ output to its D-input, dividing the input clock pulse STL or STL', respectively, by two to produce pulses with half the clock frequency at its Q-output. The other two D-flip flops build a 2-bit-shift register in which input the data sequence SF2 is fed and which is clocked by the clock pulse STL or STL', respectively, having at the Q-outputs the parallel data streams SF2' and SF2", respectively.

All the digital circuits of FIGS. 2, 3 and 4 can be realised by the circuits according to the F 100 K ECL Data Book of Fairchild 1982.

Particularly low expenditures for logic components result if the number n of parallel shift register branches is smaller than the position number of the first feedback-connected stage in the identical serial shift register. This reduces the operating frequency by the factor n. For example, a serial 16-bit shift register having feedbacks Q 7, Q 9, Q 12 and Q 16 can be split advantageously into n=4 parallel branches in order to generate a digital positive negative signal sequence of a period of maximum length. The replacement of the shift register in the transmitter as well as in the signature analyser by parallel shift register structures as discussed above produces a circuit structure which is much less critical with respect to frequency.

Series-parallel generation is derived and described in "Series-parallel generation of m-sequences" by O'Reilly in The Radio and Electronic Engineer, Vol. 45, No. 4, pages 171–176, April 1975.

What we claim is:

1. Circuit arrangement for dynamic real time testing of a synchronous digital circuit having a clock pulse input, a stimulus input and a circuit node, wherein a digital test signal is produced at the circuit node of the digital circuit after a time delay, caused by the digital circuit, of $\tau$ seconds relative to the time of receipt of a signal at the stimulus input of the digital circuit, said arrangement comprising:

clock pulse generator means for generating clock pulses;

transmitter means connected to said clock pulse generator means and including a counter for counting the clock pulses and a digital signal generator means for generating a reproducible digital stimulus signal having a length corresponding to a predetermined count of said counter, said transmitter means having a clock pulse output and being connected for coupling a number of clock pulses corresponding to the predetermined count of said counter to the clock pulse input of the digital circuit and for delivering the digital stimulus signal to the stimulus input of the digital circuit in synchronism with the clock pulses coupled to the clock pulse input;

delay means having an input and an output, the input of said delay means being connected to the clock pulse output of said transmitter for delaying the clock pulses by a time delay corresponding to the $\tau$ second time delay of the digital test signal caused by the digital circuit; and analyzing means having a first input arranged for receiving the digital test signal from the digital circuit and a second input connected to the output of said delay means for receiving the same number of clock pulses, delayed by $\tau$ seconds, coupled to the digital circuit, said analyzing means including feedback shift register means for compressing the test signal into a test signature which can be checked for errors by comparison with a desired signature.

2. Circuit arrangement as defined in claim 1, wherein the digital circuit, said transmitter means and said analyzing means each have a reset input and further comprising reset means which is connectable for delivering a reset signal to a respective one of the reset inputs of the digital circuit, said transmitter means and said analyzer means.

3. Circuit arrangement as defined in claim 1, wherein said delay means comprises a separate delay device which is connected between the second input of said analyzing means and said clock pulse generator means and which is adjustable to delay the clock pulses by the delay time $\tau$.

4. Circuit arrangement as defined in claim 1 forming a combination with said digital circuit, wherein said delay means comprises a part of said digital circuit, and said digital circuit includes a clock pulse output for presenting the clock pulses delayed by the delay time $\tau$.

5. Circuit arrangement as defined in claim 1, wherein said feedback shift register means includes a feedback connected m-bit signature shift register, with m = 1, 2, 3, ..., for receiving and compressing the digital test signal.

6. Circuit arrangement as defined in claim 1, wherein said feedback shift register means includes a predetermined number n of parallel branches each having a feedback-connected m/n-bit shift register, where m is the number of bits in the test signature.

7. Circuit arrangement as defined in claim 1, wherein the predetermined count of said counter defines a measuring period and said transmitter means further includes an OR gate having a first input connected to said clock pulse generator means for receiving the clock pulses, a second input connected with the output of said counter, and an output connected to the clock pulse input of the digital circuit for delivering clock pulses to the digital circuit for the duration of the measuring period, the output of said counter causing said OR gate to block the clock pulses at the end of the measuring period.

8. Circuit arrangement as defined in claim 1, wherein said digital signal generator includes a feedback-connected p-bit shift register, where p = 1, 2, 3, . . . .

9. Circuit arrangement as defined in claim 1, wherein said digital signal generator means incudes a number q of parallel branches each having a feedback-connected p/q-bit shift register, where p is a positive integer and $2^{p-1}$ is the number of bits in the digital stimulus signal.

* * * * *